US008098392B2

(12) United States Patent
Yamaguchi et al.

(10) Patent No.: US 8,098,392 B2
(45) Date of Patent: Jan. 17, 2012

(54) CONTROLLING PROGRAM AND IMAGE FORMING APPARATUS

(75) Inventors: Yasuhiko Yamaguchi, Hino (JP); Takeshi Nakajima, Hino (JP)

(73) Assignee: Konica Minolta Business Technologies, Inc. (JP)

( * ) Notice: Subject to any disclaimer, the term of this patent is extended or adjusted under 35 U.S.C. 154(b) by 796 days.

(21) Appl. No.: 12/210,093

(22) Filed: Sep. 12, 2008

(65) Prior Publication Data

US 2009/0091784 A1 Apr. 9, 2009

(30) Foreign Application Priority Data

Oct. 5, 2007 (JP) ................................ 2007-261853

(51) Int. Cl.
*G06F 15/00* (2006.01)
*G06F 15/16* (2006.01)

(52) U.S. Cl. ...................................... 358/1.15; 709/206

(58) Field of Classification Search ................ 358/1.15, 358/1.14, 1.13, 1.18, 3.28, 1.12, 438, 474, 358/403, 426.02, 426; 709/219, 217, 223, 709/201, 227, 206; 379/88.14, 88.16, 93.02; 370/352, 493, 465

See application file for complete search history.

(56) References Cited

U.S. PATENT DOCUMENTS 7,936,482 B2 * 5/2011 Takezaki et al. ............ 358/3.28

FOREIGN PATENT DOCUMENTS

JP 11-122409 4/1999

* cited by examiner

*Primary Examiner* — Saeid Ebrahimi Dehkordy

(74) *Attorney, Agent, or Firm* — Squire, Sanders & Dempsey (US) LLP

(57) ABSTRACT

There is described a network system that includes a plurality of image forming apparatuses, which are coupled to each other through a network, and each of which makes it possible to output guidance by emitting an audible voice from an image forming apparatus located in the vicinity of the specific user who has instructed any one of the other image forming apparatuses to implement a print job. Each of the plurality of image forming apparatuses includes: a communication section to bilaterally communicate information with other image forming apparatuses; an authenticating section to authenticate whether or not the specific user resides in a peripheral area of the image forming apparatus concerned; and a voice outputting section to output the guidance for the specific user by emitting the audible voice.

13 Claims, 7 Drawing Sheets

1
20A
20B
20C
20D
30
10A
10B

CONTROLLING PROGRAM AND IMAGE FORMING APPARATUS

This application is based on Japanese Patent Application NO. 2007-261853 filed on Oct. 5, 2007, with Japan Patent Office, the entire content of which is hereby incorporated by reference.

BACKGROUND OF THE INVENTION

The present invention relates to a controlling program to be executed in a network system so as to output audible voices indicating guidance for a user and also relates to an image forming apparatus that output the above audible voices.

In recent years, various kinds of image forming apparatuses, such as a copier, a printer, etc., have employed various kinds of technologies to improve usability. For instance, cited as one of such the technologies can be a voice guiding facility, to audibly announce the contents of a trouble or the like occurring within the image forming apparatus by using audible voices. According to the image forming apparatus provided with the above voice guiding facility, it becomes possible for the user to easily grasp the current status of the image forming apparatus, even if the user is apart from the installation place of the malfunctioning image forming apparatus. Further, even if the user is a visually handicapped person, it also becomes possible for the user to easily grasp the current status of the image forming apparatus as well.

Tokkaihei 11-122409 sets forth such a technology that, when a certain trouble occurs in an image forming apparatus, audible voices indicating the contents of the trouble are outputted from the speaker upon a request of the user. According to this technology, it becomes possible for the user to hear the contents of the trouble announced by the audible voices as needed, resulting in an improvement of availability of the image forming apparatus concerned.

In a typical office environment, sometimes, plural kinds of image forming apparatuses, including an image forming apparatus capable of outputting color images, another image forming apparatus capable of outputting only monochrome images, etc., are installed. Under such an office environment as abovementioned, the user selects a suitable image forming apparatus from the plural image forming apparatuses coupled to each other through a network, in order to output an image onto a paper sheet.

When a plurality of image forming apparatuses are installed into the office as abovementioned, the user, who instructed one of the plurality of image forming apparatuses to output an image through the network, does not necessary need to be within a peripheral area of the image forming apparatus concerned. Under such the office environment as abovementioned, even if a message, indicating contents of a trouble occurring in the image forming apparatus, a completion of an image outputting operation, etc., is announced via audible voice, the contents of the message cannot reach the user who instructed the image forming operation, but merely a useless voice sound would be emitted from the image forming apparatus concerned. In addition, it has been a problem that such the useless voice sound would result in noise pollution by which other users working around the image forming apparatus concerned would be irritated.

Therefore, it is required to provide a controlling program and an image forming apparatus, each of which makes it possible to output guidance by emitting an audible voice from an image forming apparatus located in the vicinity of the user who has instructed any one of other image forming apparatuses to implement a print job.

SUMMARY OF THE INVENTION

The aspects of the present invention are any one of the computer readable storage mediums and the image forming apparatus described as follows.

(1) According to a computer readable storage medium reflecting an aspect of the present invention, in a network system that includes a plurality of image forming apparatuses, which are coupled to each other through a network, and each of which comprises: a communication section to bilaterally communicate information with other image forming apparatuses; an authenticating section to authenticate whether or not a specific user resides in a peripheral area of an image forming apparatus concerned; and a voice outputting section to output guidance for the specific user by generating audible voice, the computer readable storage medium stores a computer executable program to be executed in either one of the plurality of image forming apparatuses or a specific apparatus coupled to the plurality of image forming apparatuses through the network, the program being executable by a computer to cause the computer to perform a process comprising: making a first image forming apparatus, being one of the plurality of image forming apparatuses, implement a print job instructed by the specific user; transmitting request information to a second image forming apparatus, being another one of the plurality of image forming apparatuses, so as to request for authenticating whether or not the specific user resides in a peripheral area of the second image forming apparatus, in such a case that the guidance should be announced to the specific user who currently resides out of such a range that the first image forming apparatus can authenticate a location of the specific user by itself; authenticating whether or not the specific user resides in the peripheral area of the second image forming apparatus that has received the request information; making the voice outputting section of the second image forming apparatus that has detected the specific user residing within the peripheral area of the second image forming apparatus, output the guidance for the specific user by generating audible voice.

(2) According to a computer readable storage medium reflecting another aspect of the present invention, the computer readable storage medium stores a computer executable program for making a first image forming apparatus implement predetermined operations, the program being executable by a computer to cause the computer to perform a process comprising: making the first image forming apparatus transmit request information to a second image forming apparatus so as to request for authenticating whether or not a specific user, who has instructed the first image forming apparatus to implement a print job, resides in a peripheral area of the second image forming apparatus, in such a case that guidance should be announced to the specific user who currently resides out of such a range that the first image forming apparatus can authenticate a location of the specific user by itself.

(3) According to a computer readable storage medium reflecting still another aspect of the present invention, the computer readable storage medium stores a computer executable program for making a first image forming apparatus implement predetermined operations, the program being executable by a computer to cause the computer to perform a process comprising: receiving request information sent from a second image forming apparatus that is coupled to the first image forming apparatus through a network, so as to request for authenticating whether or not a specific user resides in a peripheral area of the first image forming apparatus; authenticating whether or not the specific user resides in the peripheral area of the first image forming apparatus; outputting guidance for the specific user by generating an audible voice, when it is recognized in the authenticating step that the specific user resides in the peripheral area of the first image forming apparatus.

(4) According to an image forming apparatus reflecting yet another aspect of the present invention, the image forming apparatus that forms an image on a sheet, comprises: a communication section to receive information transmitted from an external device; an authenticating section to authenticate whether or not a specific user resides in a peripheral area of the image forming apparatus; a voice outputting section to output guidance for a user by generating audible voice; and a controlling section to control operations to be conducted in the image forming apparatus; wherein, when the communication section receives request information to request for authenticating whether or not the specific user resides in the peripheral area of the image forming apparatus, the controlling section controls the authenticating section so as to authenticate whether or not the specific user resides in the peripheral area of the image forming apparatus; and wherein, when the authenticating section authenticates that the specific user resides in the peripheral area of the image forming apparatus, the controlling section controls the voice outputting section to output the guidance for the specific user by generating the audible voice.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which.

DETAILED DESCRIPTION OF THE PREFERRED EMBODIMENT

Figure 1:
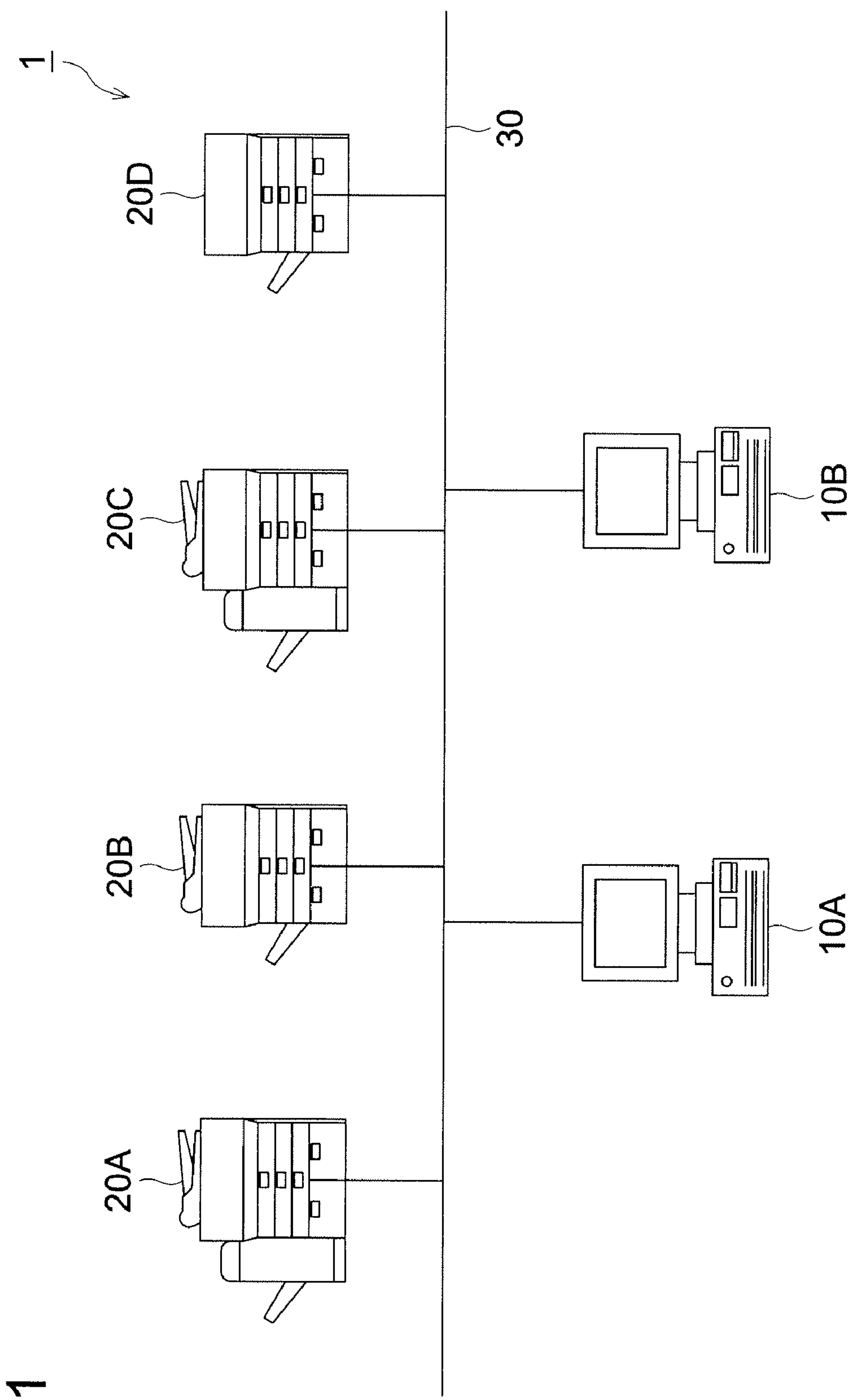
FIG. 1 shows a schematic diagram indicating a brief configuration of a network system, embodied in the present invention.

FIG. 1 shows a schematic diagram indicating a brief configuration of a network system 1.

In the network system 1 shown in FIG. 1, plural terminal devices 10A, 10B and plural image forming apparatuses 20A, 20B, 20C, 20D are coupled to each other through a LAN (Local Area Network) 30. Plural printer drivers in respect to the image forming apparatuses 20A, 20B, 20C, 20D are installed in advance into each of the terminal devices 10A, 10B, so that each of the terminal devices 10A, 10B can make each of the image forming apparatuses 20A, 20B, 20C, 20D to implement a print job through the LAN 30.

Each of the image forming apparatuses 20A, 20B, 20C is provided with a copying function, a printer function and a facsimile function, while the image forming apparatus 20D is provided with only a printer function. The image forming apparatuses 20A, 20B, 20C, 20D can bilaterally communicate various information with each other through the LAN 30. Each of the image forming apparatuses 20A, 20B, 20C, 20D is coupled to the LAN 30 through an interface in conformity with the 10Base-T or the like, and forms a color image or a monochrome image onto a paper sheet by employing, for instance, an electro-photographic method.

Further, each of the image forming apparatuses 20A, 20B, 20C, 20D is capable of outputting an audible recorded voice announcing guidance for the user. For instance, in case that a jam of a paper sheet or a toner shortage or a no toner occurs in mid-course of implementing the print job, the prerecorded voice announcing such the inconvenience is outputted from the image forming apparatus concerned. Accordingly, it is possible for the user, while using any one of the image forming apparatuses 20A, 20B, 20C, 20D, to easily realize the current status of any one of the image forming apparatuses, even if the user moves away from the image forming apparatus concerned.

The controlling programs, embodied in the present invention, are stored in each of the image forming apparatuses 20A, 20B, 20C, 20D, so that the CPU provided in each of them reads out and executes the program codes included in the controlling programs to implement the predetermined operations. Namely, each of the image forming apparatuses 20A, 20B, 20C, 20D also serves as a computer. Alternatively, it is also applicable that a control server, which stores the controlling programs therein, is coupled to the LAN 30, so that the control server can conduct the various controlling operations to be implemented on the network system 1.

In this connection, a number of terminal devices and another number of the image forming apparatuses to be coupled to the LAN 30 is not limited to those indicated in FIG. 1. Further, the scope of the image forming method to be employed in the image forming apparatuses 20A, 20B, 20C, 20D is not limited to the electro-photographic method, but shall include any kind of image forming method, such as an ink-jetting method, a thermal sublimation method, a silver halide photographic method, etc., other than the electro-photographic method.

Figure 2:
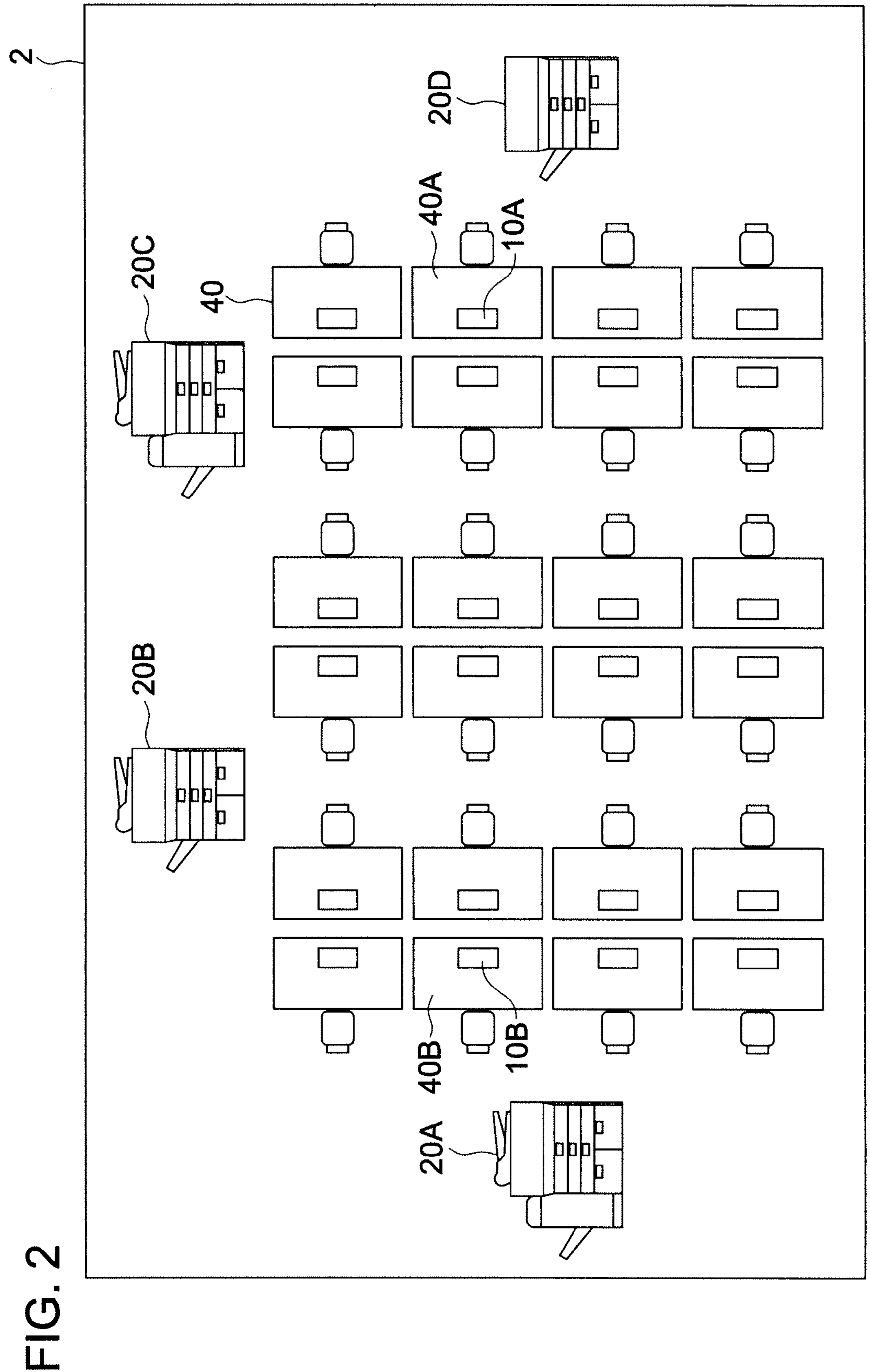
FIG. 2 shows a rough schematic diagram indicating an arrangement of plural terminal devices and plural image forming apparatuses installed in one room.
Figure 3:
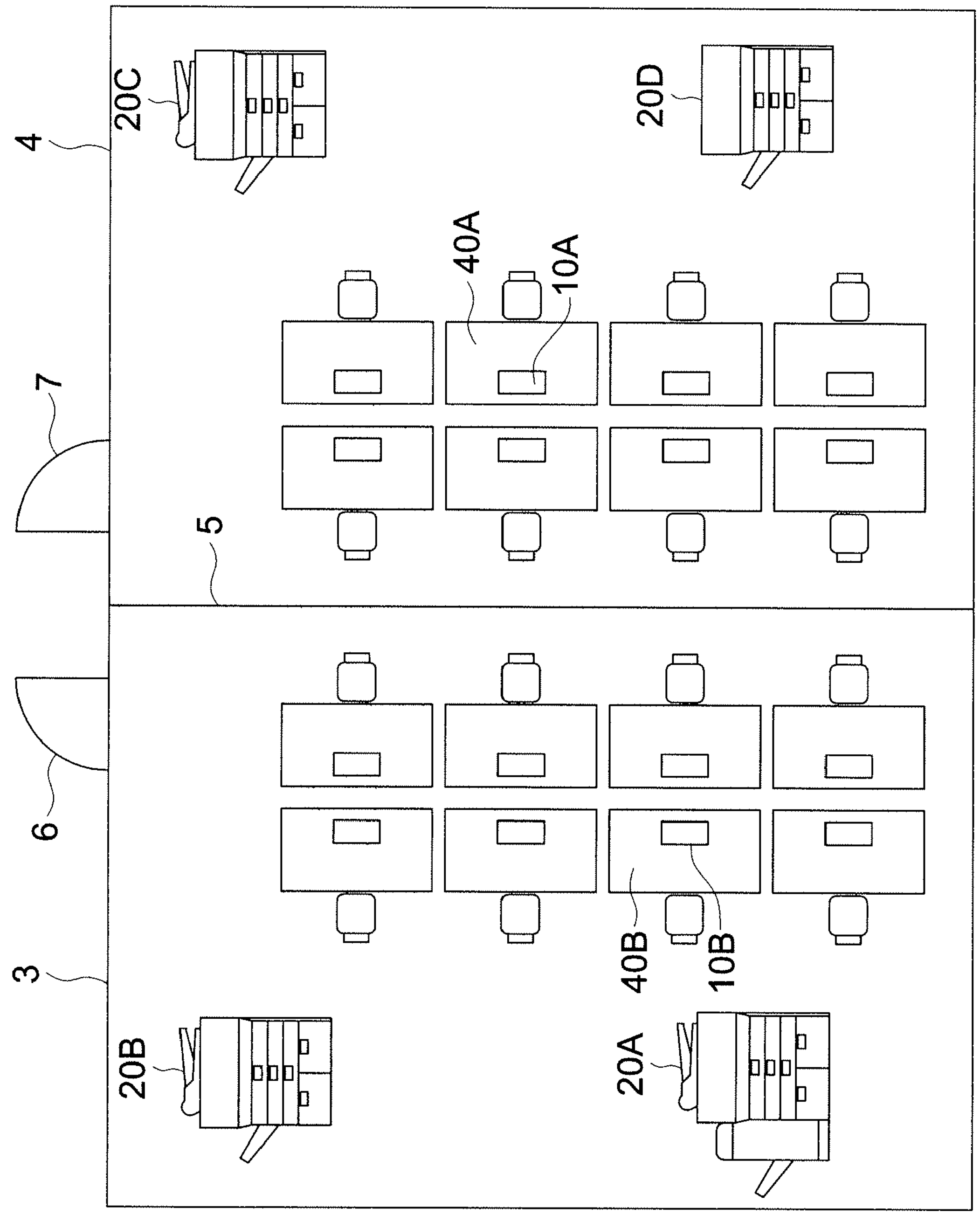
FIG. 3 shows another rough schematic diagram indicating an arrangement of plural terminal devices and plural image forming apparatuses installed in two rooms partitioned by a wall.

For instance, the network system 1 shown in FIG. 1 is utilized in a typical office environment shown in FIG. 2 or FIG. 3.

FIG. 2 shows a rough schematic diagram indicating an arrangement of plural terminal devices and plural image forming apparatuses installed in one room, while FIG. 3 shows another rough schematic diagram indicating the same in two rooms.

In an office 2 shown in FIG. 2, four sets of image forming apparatuses 20A, 20B, 20C, 20D and desks 40 to be used by 24 users are installed on a one floor. The terminal devices respectively placed on the desks 40 and the image forming apparatuses 20A, 20B, 20C, 20D are coupled to each other through the LAN 30, so as to configure the network system 1 aforementioned by referring to FIG. 1. For instance, it is possible for the user to make either the image forming apparatus 20A or the image forming apparatus 20B implement a print job based on the instruction issued by the terminal device 10A placed on a desk 40A.

On the other hand, according to the layout shown in FIG. 3, the one floor is partitioned into an office 3 and an office 4 by a wall 5, and the user can come and go between the office 3 and the office 4 through a door 6 and a door 7. In the office 3, two sets of image forming apparatuses 20A, 20B are installed, while another two sets of image forming apparatuses 20C, 20D are installed in the office 4. Although the office 3 and the office 4 are partitioned from each other by the wall 5, the terminal devices respectively placed on the desks 40 and the image forming apparatuses 20A, 20B, 20C, 20D are coupled to each other through the LAN 30, so as to configure the network system 1 aforementioned by referring to FIG. 1. For instance, it is possible for the user to make either the image forming apparatus 20A, installed in the office 3, or the image forming apparatus 20C, installed in the office 4, implement a print job based on the instruction issued by the terminal device 10A placed on the desk 40A.

Now, a case will be exemplified in which the terminal device 10A placed on the desk 40A in the office 2 instructs the image forming apparatus 20A to implement the print job, and will be further detailed in the following.

As mentioned before while referring to FIG. 1, the image forming apparatus 20A is capable of outputting the audible voice announcing an alert of guidance for the user, and accordingly, in case a problem such as a paper sheet jam occurs in mid-course of implementing a print job, the image forming apparatus 20A is capable of outputting the audible voice announcing the contents of the trouble, etc. However, since the user, who instructed the implementation of the print job concerned, is sitting at the desk 40A that is far apart from the image forming apparatus 20A, the contents of the message cannot reach the user of the terminal device 10A even if the image forming apparatus 20A announces the contents of the trouble, etc., by outputting the audible voice sound, but merely a useless voice sound is emitted from the image forming apparatus 20A. In addition, it may be a problem that such the useless voice sound results in noise pollution by which other users working around the image forming apparatus 20A are troubled.

Accordingly, to overcome the above-mentioned shortcomings, the present embodiment is so constituted that an image forming apparatus, located at a position in the vicinity of the user who instructed the implementation of the print job concerned, outputs the audible voice sound announcing an alert of guidance for the user. This feature will be detailed in the following.

Initially, configurations of the image forming apparatus 20A, etc., will be detailed in the following.

Figure 4:
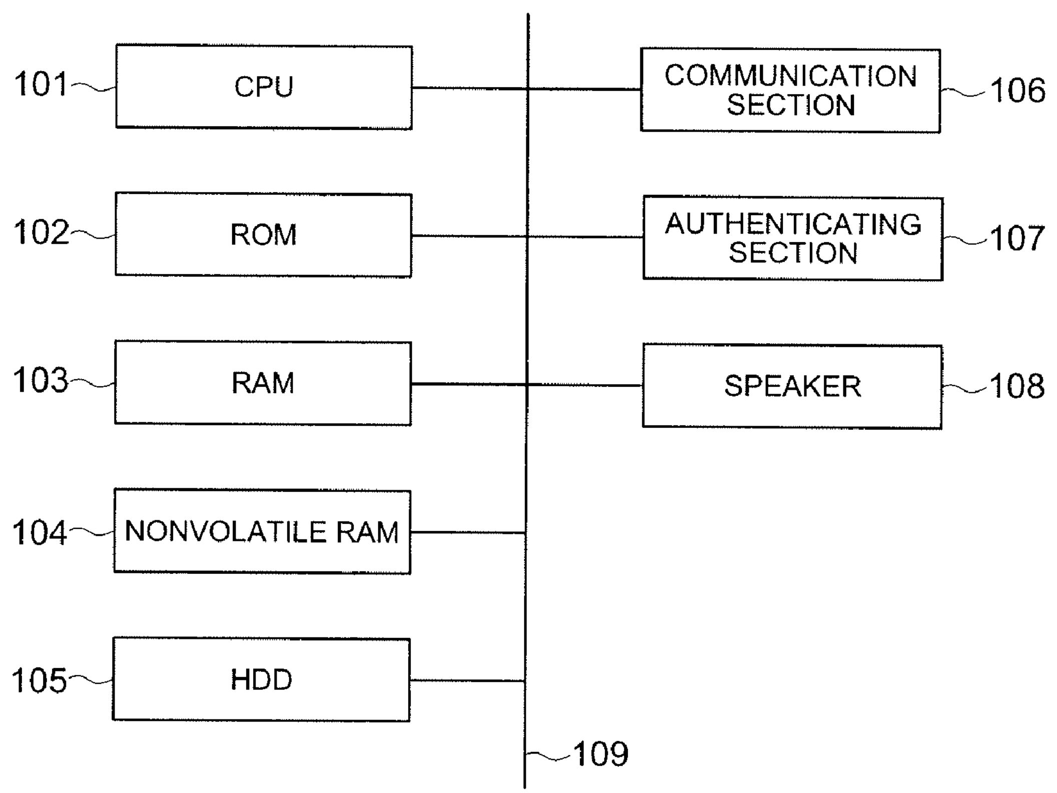
FIG. 4 shows a block diagram of a control system of an image forming apparatus embodied in the present invention.

FIG. 4 shows a block diagram of a control system of the image forming apparatus 20A, though only a typical one is indicated. Each of the other image forming apparatuses 20B, 20C, 20D has a similar configuration as that of the image forming apparatus 20A.

A CPU (Central Processing Unit) 101 is coupled to a ROM (Read Only Memory) 102, a RAM (Random Access Memory) 103, etc., through a system bus 109. The CPU 101 reads out various kinds of programs stored in the ROM 102 and develops them on the RAM 103, so as to control various kinds of operations to be conducted in each of the sections. Further, the CPU 101 implements various kinds of processing according to the programs developed on the RAM 103, and then, stores the processing results into the RAM 103 and displays the processing results on an operating panel. Successively, the CPU 101 conducts controlling operations for transferring the processing results, currently stored in the RAM 103, into the predetermined storage destination from the RAM 103. In this connection, the CPU 101 in conjunction with the ROM 102 and the RAM 103 constitutes a controlling section of the present embodiment.

The ROM 102 is typically constituted by semiconductor storage devices, so as to store, in advance, various kinds of programs, data, etc. The controlling program, embodied in the present invention, is stored in this ROM 102.

The RAM 103 forms a working area in which data, etc. processed by executing various kinds of programs in the CPU 101 are temporarily stored, therein.

A nonvolatile RAM 104 temporarily stores processed data, etc., and stores various kinds of setting data necessary for activating the image forming apparatus concerned, in such a manner that the stored data, etc. do not disappear (or are not erased) even if the power source of the image forming apparatus 20A is turned OFF.

An HDD (Hard Disc Drive) 105 stores image data read from the original document image, acquired by a scanner section, and other outputted image data, etc. The HDD 105 is constituted by a considerable number of metal discs, the surface of each of which is coated with or vapor-deposited with magnetic material, and which are superposed with each other at constant intervals, so as to make it possible to read and write data by magnetic heads approaching the metal discs while rotating the metal discs by a motor at a high velocity. Further, the HDD 105 also stores the contents of guidance for the user therein.

A communication section 106 is coupled to the LAN 30 so as to receive information, in respect to the implementation command of the print job, sent from the terminal device situated on the user's desk, and to bilaterally exchange information with the other image forming apparatuses 20B, 20C, 20D.

An authenticating section 107 determines (authenticates) whether or not a target user is located in the vicinity of (within a peripheral area of) image forming apparatus 20A. For instance, the authenticating section 107 employs a non-contacting method for conducting the operation for authenticating the user. The authenticating section 107 authenticates a user's ID based on information read from an IC card, an RF tag, an IC tip, etc., and then, authenticates which user resides within a peripheral area of image forming apparatus 20A, by comparing the read information with the user information stored in advance in the HDD 105.

A speaker 108, serving as a prerecorded voice outputting section, outputs an audible voice sound alerting or announcing guidance for the user. Concretely speaking, when the predetermined user is authenticated by the authenticating section 107, the speaker 108 is made to output the voice sound representing the predetermined alert or guidance information stored in the HDD 105, and/or the voice sound representing the guidance information received by the communication section 106.

Next, referring to the flowcharts shown in FIG. 5 through FIG. 7, operations to be conducted in the plurality of the image forming apparatuses 20A, 20B, 20C, 20D, shown in FIG. 2, will now be detailed in the following. The operations shown in FIG. 5 through FIG. 7, will be described by exemplifying the operations for transmitting information in regard to the implementation command of the print job from the terminal device 10A of the user, located at the desk 40A, to the image forming apparatus 20A, and then, implementing the transmitted print job in the image forming apparatus 20A (in this example, the image forming apparatus 20A corresponds to the first image forming apparatus, while the image forming apparatuses 20B, 20C, 20D correspond to the second image forming apparatus).

Figure 5:
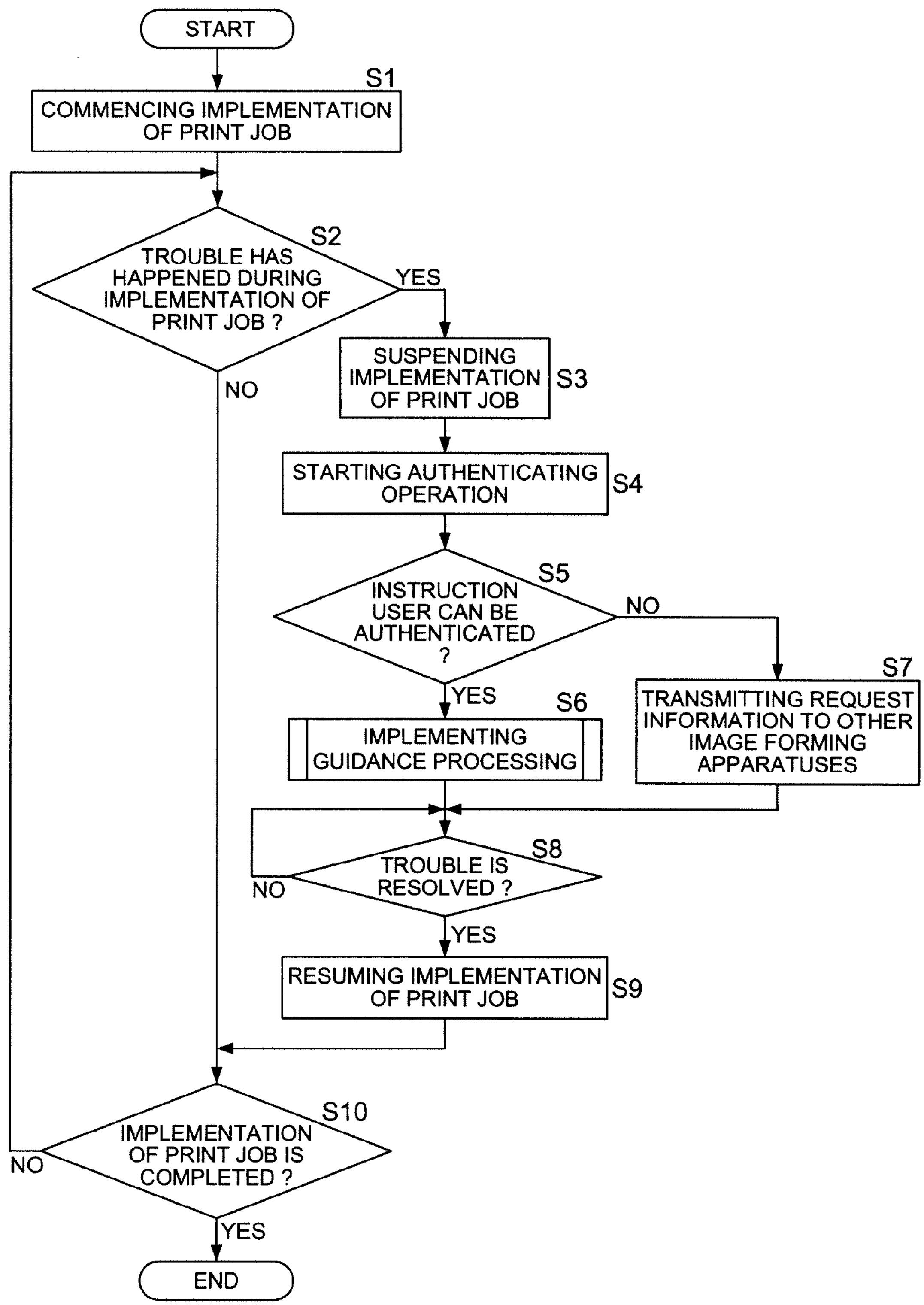
FIG. 5 shows a flowchart for explaining operations for transmitting request information in respect to a user authentication to another image forming apparatus.

FIG. 5 shows a flowchart for explaining the operations for transmitting request information in respect to the user authentication to another image forming apparatus.

At first, based on instructions sent from the terminal device 10A, the image forming apparatus 20A commences the implementation of the print job for forming an image onto a paper sheet (Step S1).

Successively, the image forming apparatus 20A determines whether or not a kind of trouble (such as a paper sheet jam, an empty toner cartridge, etc.) has happened during the implementation of the print job (Step S2).

When determining that no trouble has happened during the implementation of the print job (Step S2; No), the image forming apparatus 20A continues to implement the print job until the print job concerned is completed.

On the other hand, when determining that a kind of trouble has happened during the implementation of the print job (Step S2; Yes), the image forming apparatus 20A suspends the implementation of the print job (Step S3), and starts the authenticating operation to determine whether or not the user who instructed the image forming apparatus 20A to implement the print job concerned (hereinafter, referred to as an "instruction user"; in this connection, the instruction user also corresponds to a predetermined user) works in a peripheral area of the image forming apparatus 20A (for instance, within a range of a predetermined distance from the image forming apparatus 20A) (Step S4).

When it can be authenticated that the instruction user resides in the peripheral area of the image forming apparatus 20A (Step S5; Yes), the image forming apparatus 20A implements a guidance processing to notify the instruction user of contents of the problem by emitting an audible voice (Step S6). Detailed explanation in regard to the guidance processing will be provided later on.

On the other hand, when it cannot be authenticated that the instruction user works in the peripheral area of the image forming apparatus 20A (Step S5; No), since it is nonsense (useless) for the image forming apparatus 20A to emit an audible voice for announcing the guidance, the image forming apparatus 20A transmits information for requesting the commencement of the user authenticating operation to the other image forming apparatuses 20B, 20C, 20D, so as to authenticate whether or not the instruction user works in the peripheral area of any one of the image forming apparatuses 20B, 20C, 20D (Step S7, serving as a request information transmitting process). This requested information includes information with respect to the instruction user and other information with respect to the contents of the guidance.

When the operations of Step S6 and Step S7 are completed, the image forming apparatus 20A determines whether or not the trouble, which has happened in mid-course of implementing the print job, has been resolved (Step S8). When it has been determined that the problem has been resolved (Step S8; Yes), the image forming apparatus 20A resumes the implementation of the print job concerned (Step S9).

Figure 6:
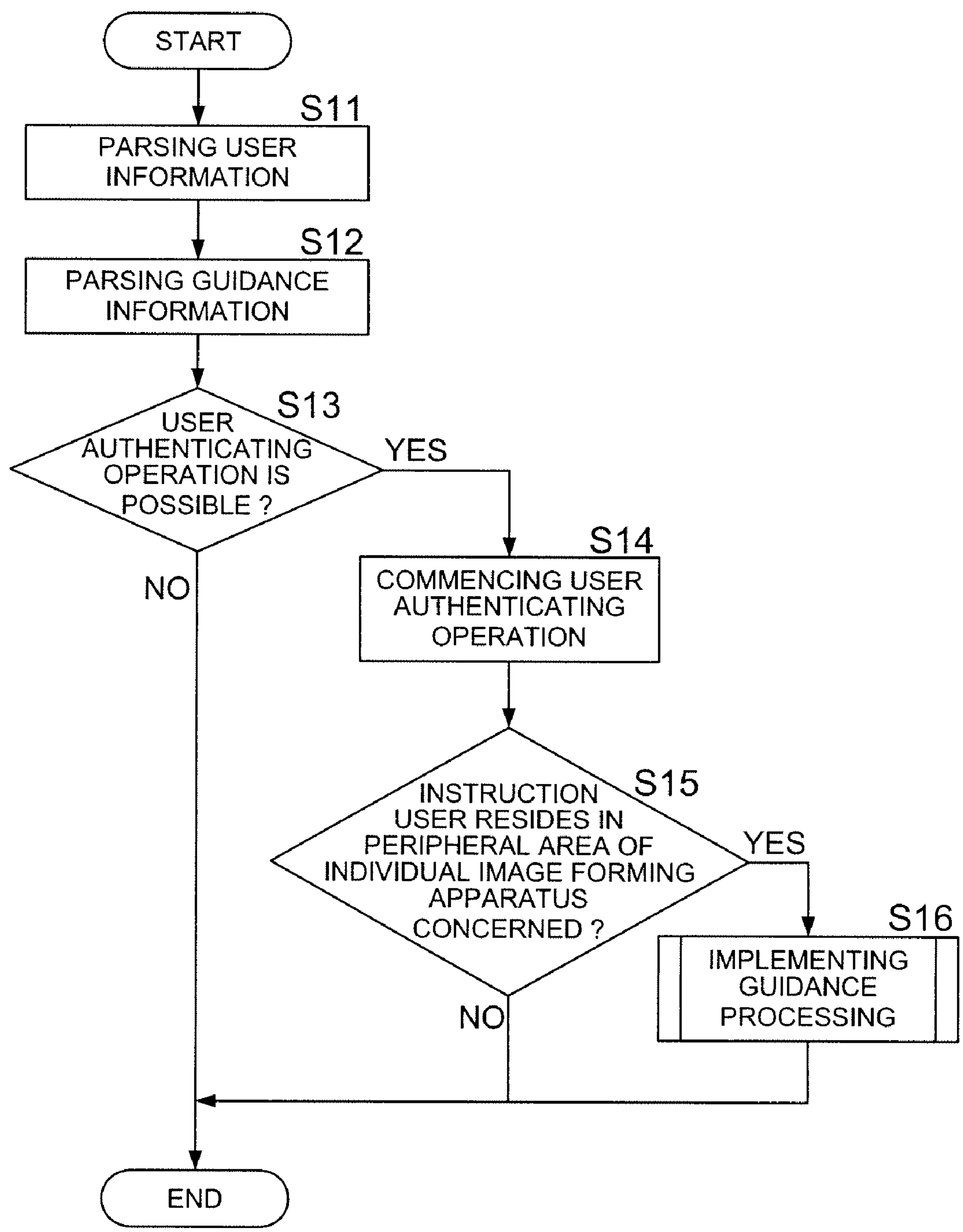
FIG. 6 shows a flowchart for explaining authenticating operations to be conducted by another image forming apparatus that receives request information.

FIG. 6 shows a flowchart for explaining the authenticating operation to be conducted in any one of other image forming apparatuses that receive the request information.

The operations indicated in FIG. 6 are to be conducted by any one of image forming apparatuses 20B, 20C, 20D that receive the information request sent from the image forming apparatus 20A in Step S7 shown in FIG. 5.

At first, receiving the request information sent from the image forming apparatus 20A (request information receiving process), every one of image forming apparatuses 20B, 20C, 20D (hereinafter, referred to as an individual image forming apparatus, for simplicity) parses the user information included in the request information (Step S11), and also parses the guiding information included in the request information (Step S12). The parsing operations to be conducted in Step S11 and Step S12 are to collate the user information and the guidance information, both included in the request information, with the data stored in the HDD 105 equipped in the individual image forming apparatus, so as to determine whether or not the user information and the guidance information, corresponding to those included in the request information, exist in the data stored in the HDD 105 (the order of collating them is not specified). Then, based on the results of parsing the user information and the guidance information, the individual image forming apparatus determines whether the operation for authenticating the instruction user is possible or impossible (Step S13).

When it has been determined that the operation to authenticate the instruction user is impossible (Step S13; No), the individual image forming apparatus finalizes the processing as it is (END). While, when it has been determined that the operation to authenticate the instruction user is possible (Step S13; Yes), the individual image forming apparatus commences the user authenticating operation (Step S14), and successively, starts the authenticating operation to determine whether or not the instruction user works in the peripheral area of the individual image forming apparatus, being any one of image forming apparatuses 20B, 20C, 20D (Step S14 and Step S15, serving as the authenticating process).

When it has been determined that the instruction user does not work in the peripheral area of the individual image forming apparatus (Step S15; No), the individual image forming apparatus concerned finalizes the processing as it is (END). On the other hand, when it has been determined that the instruction user works in the peripheral area of the individual image forming apparatus (Step S15; YES), the individual image forming apparatus concerned implements the guidance processing to notify the instruction user of contents of the problem, happening in the image forming apparatus 20A, by emitting an audible voice (Step S16).

The guidance processing to be implemented in the Step S6, shown in FIG. 5, is the same as that to be implemented in the Step S16 shown in FIG. 6, and will be detailed in the following while referring to FIG. 7.

In the guidance processing, initially, the image forming apparatus determines whether or not the distance between the image forming apparatus concerned and the instruction user is in a range of a predetermined distance (for instance, equal to or smaller than 5 meters) (Step S21), in order to output different kinds of voice guidance corresponding to the distance between the image forming apparatus and the instruction user by emitting an audible voice. Concretely speaking, according to the flowchart shown in FIG. 5, the distance defined in Step S21 represents a distance between the image forming apparatus 20A and the instruction user, while, according to the flowchart shown in FIG. 6, represents another distance between any one of image forming apparatuses 20B, 20C, 20D and the instruction user.

When it has been determined that the distance between the image forming apparatus and the instruction user is in a range of the predetermined distance (Step S21; Yes), the image forming apparatus outputs detailed alert or guidance (a second guidance) from the speaker (Step S22, serving as an outputting process). By hearing the detailed guidance, the instruction user can grasp the detailed current status of the image forming apparatus 20A.

For instance, the detailed guidance is such a guidance that includes a message of "Paper sheet jamming trouble has happened in the image forming apparatus located at ABC site.

A paper sheet is jammed at the fixing section. Please remove the paper sheet according to the guide".

On the other hand, when it has been determined that the distance between the image forming apparatus and the instruction user is out of the range of the predetermined distance (Step S21; No), the image forming apparatus outputs simplified guidance (a first guidance) from the speaker (Step S23, serving as an outputting process). For instance, the simplified guidance is such a guidance that includes a message of "Mr. Smith! A problem has happened during the job implementation". As shown in Step S23, by outputting the simplified guidance with audible voice at first, instead of the detailed guidance, it becomes possible not only to prevent another user, working in the office 2 shown in FIG. 2, from bothering with the noisy voice sound, but also to notify the instruction user of the fact that a certain problem has occurred in the image forming apparatus 20A.

Successively, after outputting the simplified guidance, the image forming apparatus is able to detect whether or not the instruction user approaches the image forming apparatus that outputted the simplified guidance within a predetermined time interval (for instance, within 10 minutes) (Step S24). According to this detecting method, the instruction user can be detected by contacting an IC-card of the instruction user onto a contacting-type sensor mounted in advance on the image forming apparatus concerned.

When it has been detected that the instruction user has approached the image forming apparatus within the predetermined time interval (Step S24; Yes), the image forming apparatus outputs the audible voice of the detailed guidance as well as in Step S22 (Step S25, serving as an outputting process). Accordingly, the instruction user can grasp the detailed current status of the image forming apparatus 20A. On the other hand, when it has been detected that the instruction user has not approached the image forming apparatus within the predetermined time interval (Step S24; No), the image forming apparatus finalizes the processing without outputting the detailed guidance with the audible voice (END).

Figure 7:
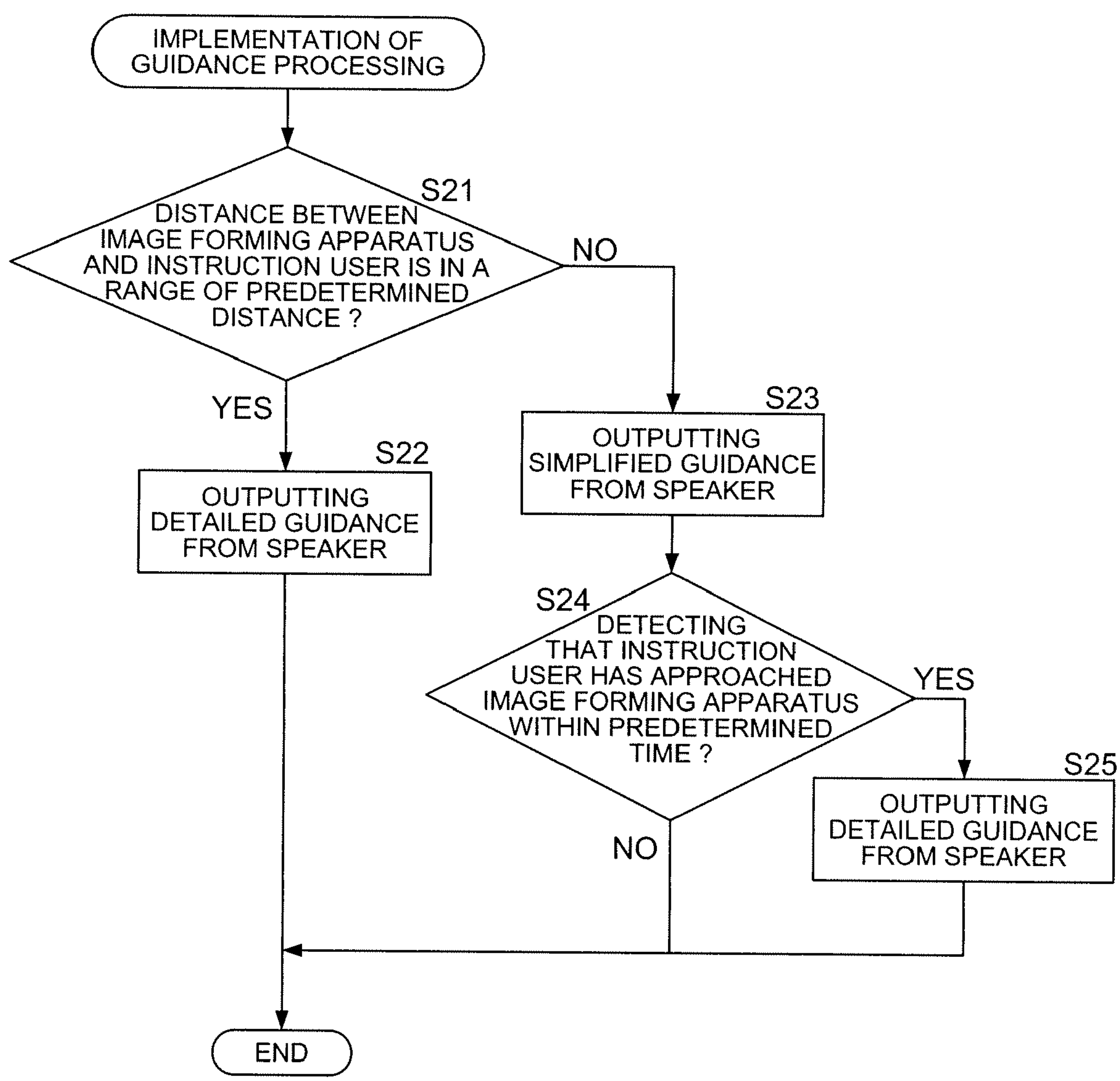
FIG. 7 shows a flowchart indicating guidance processing operations.

As detailed in the foregoing by referring to FIG. 5 through FIG. 7, according to the embodiment of the present invention, since the image forming apparatus that is located at a position in the vicinity of the user who instructed the implementation of the print job, outputs a guidance by emitting audible voice, it becomes possible not only to prevent another user from feeling bad, but also to notify the concerned user of the detailed current status of the image forming apparatus in which a certain problem has occurred. Further, by making the contents of the guidance different corresponding to the distance between the image forming apparatus and the instruction user, it becomes possible not only to prevent another user from feeling bad, but also to notify the concerned user of the detailed current status of the image forming apparatus in which a certain problem has occurred, as well as the above.

In this connection, the scope of the present invention is not limited to the aforementioned embodiment of the present invention. Further, modifications and additions made by a skilled person without departing from the spirit and scope of the invention shall be included in the scope of the present invention.

In the flowchart shown in FIG. 5, when a certain problem has happened in mid-course of implementing the print job, the image forming apparatus concerned determines that the state for notifying the user of guidance has occurred, and transmits the request information to the other image forming apparatuses. However, it is also applicable that the image forming apparatus concerned transmits the request information to the other image forming apparatuses at the time when the print job is finalized, other than at the time when a certain problem has happened, in order to announce that the print job just finished.

Further, although two kinds of guidance (namely, a detailed guidance and a simplified guidance) are outputted in the guidance processing shown in FIG. 7, it is also applicable that the image forming apparatus immediately outputs the detailed guidance without initially outputting the simplified guidance, even if the distance between the image forming apparatus and the instruction user is equal to or greater than the predetermined distance.

According to a controlling program and an image forming apparatus, both embodied in the present invention, it becomes possible to notify the user of guidance via a prerecorded audible voice.

While the preferred embodiments of the present invention have been described using specific term, such description is for illustrative purpose only, and it is to be understood that changes and variations may be made without departing from the spirit and scope of the appended claims.

What is claimed is:

1. A non-transitory computer-readable medium storing a management program that makes a network system, in which plural image forming apparatuses are coupled to each other through a network, implement a predetermined operations, wherein each of said plural image forming apparatuses comprises: a communication section to transmit or receive information; an authenticating section to authenticate whether or not a predetermined user resides in a peripheral area of an image forming apparatus; and a voice outputting section to output guidance for a user by generating audible voice, said management program making said network system implement:

a request information transmitting process, when there has occurred such a state that a first image forming apparatus, implementing a print job, should conduct the guidance to an instruction user who has instructed the first image forming apparatus to implement the print job concerned and who currently resides out of such a range that the first image forming apparatus can authenticate a location of the user by itself, for transmitting request information to a second image forming apparatus, being coupled to the first image forming apparatus on the network, so as to request for authenticating whether or not the instruction user resides in a peripheral area of the second image forming apparatus;

an authentication process for authenticating whether or not the instruction user resides in the peripheral area of the second image forming apparatus that has received the request information; and an output process for making the voice outputting section of the second image forming apparatus that has recognized the instruction user residing within the peripheral area of the second image forming apparatus, output the guidance for the instruction user by generating audible voice.

2. The management program of claim 1, wherein the guidance by the audible voice is outputted as one of plural kinds of messages, which are different from each other, corresponding to a distance between the second image forming apparatus and the instruction user authenticated by the second image forming apparatus.

3. The management program of claim 2, wherein in said output process, when the distance between the second image forming apparatus and the instruction user authenticated by the second image forming apparatus is greater than a predetermined distance, a first guidance by the audible voice is outputted, while, when the distance between the second image forming apparatus and the instruction user authenticated by the second image forming apparatus is nearer than a predetermined distance, a second guidance by the audible voice, being more detail than the first guidance, is outputted.

4. A non-transitory computer-readable medium storing A management program that makes a first image forming apparatus implement predetermined operations, said management program making said first image forming apparatus implement:

a request information transmitting process for making the first image forming apparatus transmit request information to a second image forming apparatus that is coupled to the first image forming apparatus, so as to authenticate whether or not an instruction user, who has instructed the first image forming apparatus to implement a print job, resides in a peripheral area of the second image forming apparatus, in such a case that guidance should be announced to the instruction user who does not reside within a range that the first image forming apparatus can authenticate a location of the instruction user by itself.

5. A non-transitory computer-readable medium storing A management program that makes a second image forming apparatus implement predetermined operations, said management program making said second image forming apparatus implement:

a request information receiving process for receiving request information sent from a first image forming apparatus that is coupled to the second image forming apparatus through a network, so as authenticate whether or not a predetermined user resides in a peripheral area of the first second image forming apparatus;

an authenticating process for authenticating whether or not the predetermined user resides in the peripheral area of the second image forming apparatus;

an output process for outputting guidance by audible voice from the instruction user, when it is recognized by the authenticating process that the predetermined user resides in the peripheral area of the second image forming apparatus.

6. The management program of claim 5, wherein, in the output process, the guidance by the audible voice is outputted as one of plural kinds of messages, which are different from each other, corresponding to a distance between the second image forming apparatus and the specific user authenticated by the second image forming apparatus.

7. The management program of claim 6, wherein, in said output process, when the distance between the second image forming apparatus and the instruction user authenticated by the second image forming apparatus is greater than a predetermined distance, a first guidance by the audible voice is outputed, while, when the distance between the second image forming apparatus and the predetermined user authenticated by the second image forming apparatus is nearer than a predetermined distance, a second guidance by the audible voice, being more detail than the first guidance, is outputted.

8. An image forming apparatus that forms an image on a sheet, comprising:

a communication section to receive information transmitted from an external section;

an authenticating section to authenticate whether or not a predetermined user resides in a;

a voice outputting section to output guidance for a user by generating audible voice; and a controlling section to control operations to be conducted in the image forming apparatus;

wherein, when the communication section receives request information to request for authenticating whether or not the predetermined user resides in the periphery, the controlling section controls the authenticating section so as to authenticate whether or not the specific user resides in the periphery; and wherein, when the authenticating section authenticates that the predetermined user resides in the periphery, the controlling section controls makes the voice outputting section output the guidance for the predetermined user by generating the audible voice.

9. The image forming apparatus recited in claim 8, wherein the controlling section controls the voice outputting section to output the guidance by the audible voice as one of plural kinds of messages, which are different from each other, corresponding to a distance between the predetermined user and the image forming apparatus.

10. The management program of claim 3, wherein, when it is authenticated that the distance between the second image forming apparatus and the instruction user authenticated by the second image forming apparatus is nearer than a predetermined distance after the first guidance by the audible voice has been outputted, the second guidance by the audible voice is outputted.

11. The management program of claim 7, wherein, when it is authenticated that the distance between the second image forming apparatus and the predetermined user authenticated by the second image forming apparatus is nearer than a predetermined distance after the first guidance by the audible voice has been outputted, the second guidance by the audible voice is outputted.

12. The image forming apparatus of claim 9, wherein the controlling section controls the voice outputting section in such a manner that, when the distance between the second image forming apparatus and the predetermined user authenticated is apart from a predetermined distance, the voice outputting section is made to output a first guidance by the audible voice, while, when the distance between the image forming apparatus and the predetermined user authenticated is nearer than a predetermined distance, the voice outputting section is made to output a second guidance by the audible voice, being more detail than the first guidance.

13. The image forming apparatus of claim 12, wherein the controlling section controls the voice outputting section in such a manner that, when it is authenticated that the distance between the image forming apparatus and the predetermined user is nearer than a predetermined distance after the first guidance by the audible voice has been outputted, the voice outputting section is made to output the second guidance by the audible voice.

* * * * *